United States Patent [19]

Hara et al.

[11] 4,381,480
[45] Apr. 26, 1983

[54] APPARATUS FOR CONTROLLING A BLOWER MOTOR

[75] Inventors: Toshizo Hara, Kawashima; Shinji Sutoh, Annaka; Toshio Kojima, Kounan, all of Japan

[73] Assignee: Diesel Kiki Co., Ltd., Tokyo, Japan

[21] Appl. No.: 248,835

[22] Filed: Mar. 30, 1981

[30] Foreign Application Priority Data

Mar. 31, 1980 [JP] Japan .................................. 55-40230

[51] Int. Cl.³ .............................................. G05B 5/00
[52] U.S. Cl. ................................... 318/471; 318/473; 237/5
[58] Field of Search ............... 340/501, 584, 585, 586; 236/49, 35, 13; 165/96, 42; 98/2.01, 2.05, 14; 62/243; 318/334, 471, 473; 237/12.3 R, 5, 8 A

[56] References Cited

U.S. PATENT DOCUMENTS

| | | | |
|---|---|---|---|
| 2,996,255 | 8/1961 | Boylan | 98/2.01 X |
| 3,404,835 | 10/1968 | Rodgers | 237/5 X |
| 4,124,001 | 11/1978 | Samuel et al. | 236/35 X |
| 4,316,251 | 2/1982 | Saito et al. | 237/5 X |

*Primary Examiner*—Ulysses Weldon
*Attorney, Agent, or Firm*—Guy W. Shoup; Gerard F. Dunne

[57] ABSTRACT

In an apparatus for controlling the speed of the blower motor in response to the difference between the temperature setting and the temperature inside the vehicle, the maximum speed of the blower motor is limited in accordance with the temperature of engine coolant. Consequently, the quantity of air issuing from the blower is always such that it does not make the passengers feel uncomfortable.

10 Claims, 4 Drawing Figures

APPARATUS FOR CONTROLLING A BLOWER MOTOR

The present invention relates to an apparatus for controlling a blower motor, and more particularly to an apparatus for controlling the quantity of air from a blower in accordance with the operating condition of a conditioner for the air of a vehicle.

In general, the prior art air-conditioner (heater/cooler) for automobiles has a blower motor the speed of which is controlled in accordance with the absolute difference between the temperature setting and the actual temperature in the cabin of the car. Therefore, for example, the rotational speed of the blower is high at the time the air-conditioner is turned on in the heater mode in cold weather because the difference between the temperature setting and the actual temperature inside the car is large. However, just after the engine has been started, the coolant temperature is still low so that the temperature of the heater core in the air-conditioner is also low, and because of this, having a large quantity of air issuing from the blower does not help to raise the temperature in the car. Under such circumstances, the increase air quantity from the blower only makes the passengers feel uncomfortable and may have an adverse effect on engine operation.

It is, therefore, one object of the present invention to provide an improved apparatus for controlling the blower motor of a vehicle air-conditioner.

It is another object of the present invention to provide an improved apparatus for controlling the blower motor of a vehicle air-conditioner which enables the air-conditioner to carry out the heating operation under comfortable conditions.

It is a further object of the present invention to provide an apparatus for controlling the blower motor of a vehicle air-conditioner which controls the speed of the blower motor during the heating mode operation in accordance with the temperature of the engine coolant.

In accordance with this invention there is provided an improved apparatus for controlling the speed of the blower motor of a vehicle air-conditioner having a sensor for detecting the temperature of the engine coolant and means for limiting the maximum speed of the blower motor in accordance with the resultant input from the sensor. The limiting operation is carried out only when the air-conditioner is operating in the heating mode, and under the limiting operation, the speed of the blower motor is controlled in accordance with the difference between the desired temperature setting and the actual temperature inside the vehicle (in the passenger compartment or cab). With this invention, since the speed of the blower motor is increased in proportion to the increase in the temperature of the engine coolant, comfortable heating of the vehicle interior is possible.

Further objects and advantages of the invention will be appearent from the following detailed description to be read in conjunction with the accompanying drawings in which.

Figure 1:
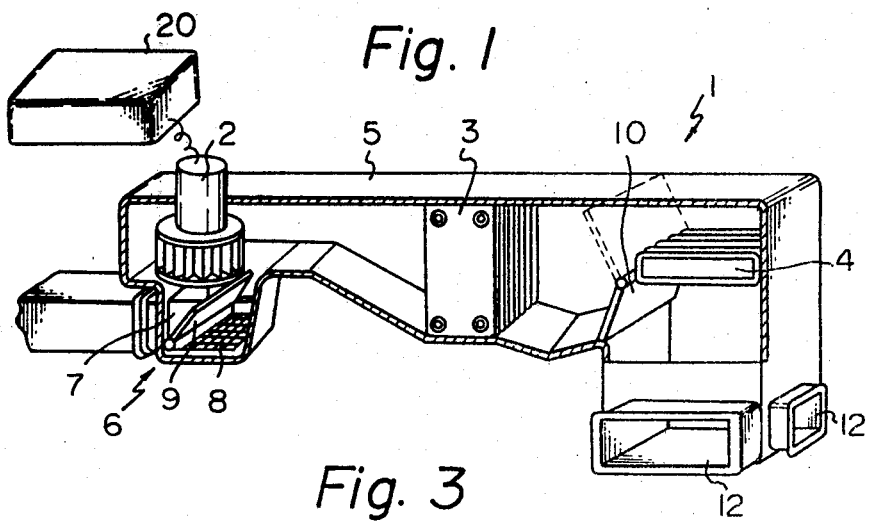
FIG. 1 illustrates a partially cutaway perspective view of an embodiment of the present invention.

FIG. 1 illustrates one embodiment of a car air-conditioner having a blower motor control unit 20 of the present invention. The car air-conditioner 1 comprises a blower 2, an evaporator 3 and a heater core 4 arranged as illustrated in FIG. 1. An intake vent 6 of a duct 5 has an opening 7 communicating with the outside of the car and an opening 8 communicating with the inside of the car. A shutter 9 is provided in the intake vent 6 to selectively close either of the openings 7 and 8. By operating the shutter 9, air from within the car or air from outside the car is selectively introduced into the duct 5 by the blower 2. In this connection, it is to be noted that the shutter 9 may be positioned at the position shown in FIG. 1 to take into the duct 5 a mixture of the air within the car and the air outside the car. In FIG. 1, numeral 10 designates a shutter for changing the path of air flow within the duct 5 to change between a heating mode and a cooling mode. The heated or cooled air is fed into the interior of the car through outlet openings 12. Numeral 20 designates a control unit for controlling the speed of the blower 2 in accordance with the difference between the set temperature desired and the actual temperature inside the car.

Figure 2:
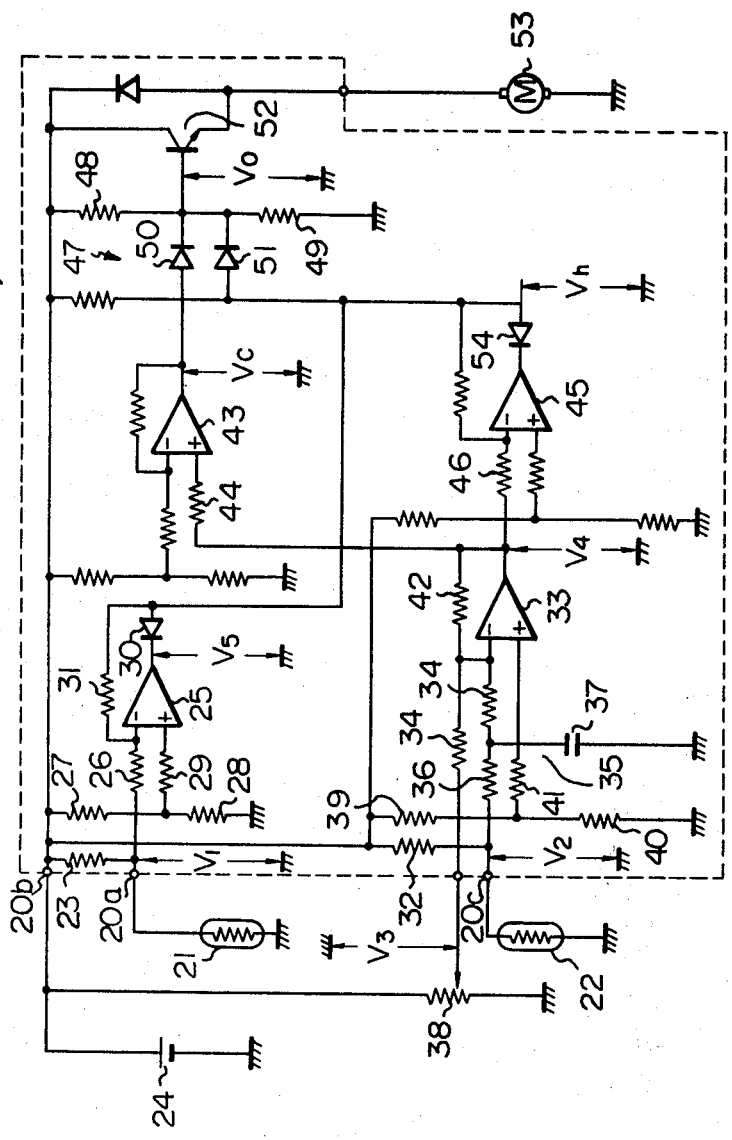
FIG. 2 is a schematic diagram of the electric circuit of the control unit shown in FIG. 1.

FIG. 2 shows the circuit diagram of the control unit 20 of the present invention, which has a thermistor 21 for detecting the temperature $T_1$ of the engine coolant and a thermistor 22 for detecting the temperature $T_2$ inside the car. The thermistor 21 has a negative temperature coefficient and is located in the engine (not shown) in such a way that the ohmic value of the thermistor 21 is changed in accordance with the coolant temperature. One terminal of the thermistor 21 is grounded and the other is connected to a terminal 20a of the control unit 20 through a suitable connecting line. The terminal 20a is connected through a resistor 23 and a terminal 20b to the positive terminal of a power source 24 which supplies regulated voltage to the circuit. The negative terminal of the power source 24 is grounded and the voltage of the power source 24 is divided by the resistor 23 and the thermistor 21 to produce the divided voltage $V_1$. Since the ohmic value of the thermistor 21 decreases with increasing coolant temperature $T_1$, the voltage $V_1$ developed across the thermistor 21 is changed in inverse proportion to the change in coolant temperature $T_1$. The voltage $V_1$ is applied to the inverting input terminal of an operational amplifier 25 through a resistor 26 and a constant voltage divided by resistors 27 and 28 is applied to the non-inverting input terminal of the operational amplifier 25 through a resistor 29. The inverting input terminal of the operational amplifier 25 is connected to the output terminal thereof through a diode 30 and a feedback resistor 31. As a result, the operational amplifier 25 acts as an inversing amplifier and produces an output voltage which changes in proportion to the coolant temperature $T_1$.

The thermistor 22 also has a negative temperature coefficient and is located at a suitable position inside the car for the purpose of detecting the interior temperature. One terminal of the thermistor 22 is grounded and the other terminal is connected to a terminal 20c of the control unit 20 through a connecting line. The terminal 20c is connected through a resistor 32 and the terminal 20b to the positive terminal of the power source 24. As a result, the voltage $V_2$, which changes in inverse proportion to temperature $T_2$ inside car, is developed across the thermistor 22, and is applied to the inverting input terminal of an operational amplifier 33 through a input resistor 34 and an integrator 35 composed of a resistor 36 and a capacitor 37.

The circuit consisting of the resistor 36 and the capacitor 37 is provided for the purpose of suppressing changes in the level of voltage $V_4$ caused by temporary changes in the temperature inside the car, such as, when the window of the car is open for a short time. This circuit stabilizes the circuit for detection of the temperature inside the car.

A variable resistor 38 acts as a temperature setting device by producing a voltage $V_3$ having a level corresponding to the desired temperature setting $T_3$. The variable resistor 38 is connected in parallel with the power source 24 and voltage $V_3$ corresponding to the desired temperature setting $T_3$ appears between the movable contact of the variable resistor 38 and ground. The voltage $V_3$ is applied to the inverting input terminal of the operational amplifier 33 and a constant voltage produced by dividing the power source voltage by resistors 39 and 40 is applied to the non-inverting input terminal thereof through a resistor 41. The output terminal of the operational amplifier 33 is connected to the inverting input terminal through a feed-back resistor 42. Therefore, the voltage $V_4$, which changes in magnitude in accordance with the magnitude of the temperature difference between $T_3$ and $T_2$, is produced by the operational amplifier 33. The voltage $V_4$ is applied to the non-inverting input terminal of an operational amplifier 43 through a resistor 44 and to the inverting input terminal of an operational amplifier 45 through a resistor 46. Constant voltages divided by resistors are applied to the other input terminals of the operational amplifiers 43 and 45.

As a result, a first control voltage $V_c$ for use in the cooling mode operation of the air-conditioner is produced by the operational amplifier 43, and a second control voltage $V_h$ for use in the heating mode operation of the air-conditioner is produced by the operational amplifier 45 through a diode 54. The first control voltage $V_c$ for use in the cooling mode operation changes in inverse proportion to the temperature difference $(T_3-T_2)$, while the second control voltage $V_h$ for use in heating mode changes in proportion to the temperature difference $(T_3-T_2)$.

Figure 3:
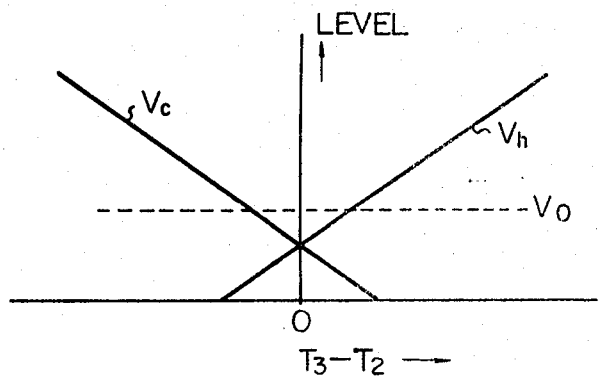
FIG. 3 is a graph illustrating the voltage characteristics produced in the circuit of FIG. 2.

FIG. 3 shows the relationship between the magnitude of $(T_3-T_2)$ and the levels of the control voltage $V_c$ and $V_h$.

These control voltages $V_c$ and $V_h$ are applied to a level discriminating circuit 47 having resistors 48 and 49, and diodes 50 and 51. A constant voltage $V_0$ divided by the resistors 48 and 49 is applied to the cathode of each of the diodes 50 and 51. The cathodes of the diodes 50 and 51 are also connected to the base of the transistor 52 for controlling the current flowing through a motor 53 of the blower 2. The value of the voltage $V_0$ is decided as shown in FIG. 3, and the voltage $V_0$ is applied to the base of the transistor 52 when the level of the voltage $V_h$ or $V_c$ is less than that of the voltage $V_0$. When the temperature $T_2$ inside the car is higher than the desired temperature $T_3$, for example, when the temperature inside the car is higher than the desired temperature during cooling mode operation in the summer, the level of the control voltage $V_c$ becomes larger to exceed to the voltage $V_0$ as the difference between $T_3$ and $T_2$ increases. On the other hand, the level of the control voltage $V_h$ becomes smaller than that of $V_0$ with the increase of the difference. Consequently, in this case, the diode 51 is biased in the reverse direction due to the reduction in the level of the control voltage $V_h$ below $V_0$, and the diode 50 is biased in the forward direction due to the increase in the level of the control voltage $V_c$ and $V_0$. As a result, the temperature inside the car becomes higher, larger collector current flows from the transistor 52 into the motor 53 connected in series to the emitter thereof to increase the rotational speed of the motor 53.

Figure 4:
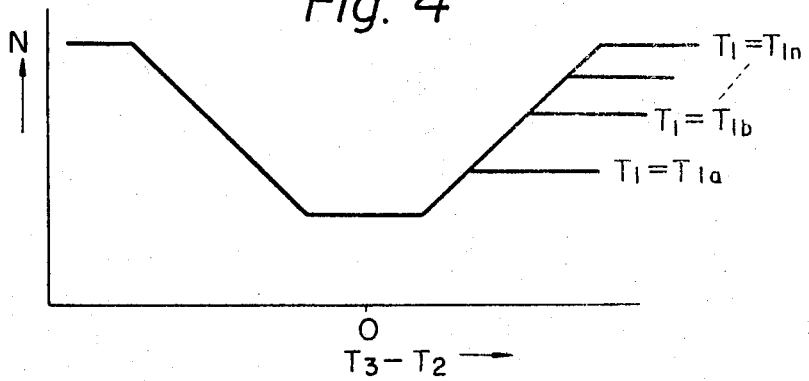
FIG. 4 is a graph illustrating the control characteristics of the control unit of FIG. 1.

In FIG. 4, the controlling characteristics for the rotational speed of the blower in accordance with the unit 20 are illustrated. Here the vertical axis represents the revolutional speed N of the blower 2 and the horizontal axis represents the magnitude of the temperature difference $(T_3-T_2)$. As can be understood from the foregoing description, the speed N is relatively small when the $T_3$ is exactly or roughly equal to $T_2$, and the speed N is increased with the increase in the difference in temperature between $T_3$ and $T_2$ during the cooling operation of the air-conditioner as illustrated the left hand portion in FIG. 4.

Next, the operation in the heating mode will be described hereinafter in conjunction with FIG. 3 again. In the heating mode operation, the desired temperature $T_3$ is set to be higher than the temperature $T_2$ inside the car. Therefore, when the difference therebetween becomes larger, the level of the control voltage $V_h$ becomes larger, and the level of the control voltage $V_c$ becomes smaller. As a result, since the diode 50 is biased in the reverse direction, whereas the diode 51 is biased in the forward direction, the speed N of the motor 53 is increased with the increase in the control voltage $V_h$.

The control unit 20 controls the quantity of air from the blower 2 in the heating mode operation not only in accordance with the difference between the desired temperature $T_3$ and the inside temperature $T_2$, but also in accordance with the temperature $T_1$ of the engine coolant. For this, the output voltage $V_5$, which changes in proportion to the coolant temperature $T_1$, is applied to the anode of the diode 51 through the diode 30. Consequently, although the potential at the anode of the diode 51 is equal to the voltage $V_h$ when $V_5 > V_h$, the potential at the anode of the diode 51 is maintained at $V_5$ irrespective of the value of the voltage $V_h$ when $V_5 \leq V_h$.

Therefore, as illustrated in FIG. 4, although during the heating mode operation of the air-conditioner the rotational speed N of the blower increases as the difference between the desired temperature setting $T_3$ and the temperature $T_2$ inside the car increases, the maximum value of the speed N is not constant but depends upon the coolant temperature $T_1$. For example, when the coolant temperature $T_1$ changes to $T_{1a}$, $T_{1b}$ . . . , $T_{1n}$ $(T_{1a} < T_{1b} < \ldots < T_{1n})$, the maximum speed is changed as shown in FIG. 4. That is, the maximum speed of the motor becomes high when the coolant temperature $T_1$ is high and the maximum speed becomes low when the temperature $T_1$ is low. Therefore, for example, when the coolant temperature $T_1$ and the engine temperature are low, for example, just after the engine has been started, even if the temperature difference between $T_3$ and $T_2$ is large, the rotational speed N of the motor 53 is suppressed so as not to make the passengers feel uncomfortable and not to have an adverse effect on engine operation.

In the above mentioned embodiment, although the magnitude of the driving current for the motor 53 is controlled by the output level of the level discriminating circuit, any known arrangement for controlling the motor speed in accordance with a change in the level of a voltage signal can be employed. For example, it is also possible to control the motor speed by arranging the motor speed control circuit in such a way that the motor is driven by the pulse signal from a pulse generator and the duty ratio of the pulse signal is controlled in accordance with the output level of the level discriminating circuit to control the motor speed.

With the circuit structure shown in FIG. 2, since the maximum speed of the blower can be limited in accordance with the coolant temperature only during the heating mode operation of the air-conditioner, it is possible to control the blower speed in such a way that the speed reaches the maximum speed only when the coolant temperature reaches a predetermined relatively high value. Since the maximum speed rises in proportion to the increase in the coolant temperature, the quantity of air issuing from the blower is always such that it does not make the passengers feel uncomfortable.

We claim:

1. An apparatus for controlling the blower motor of a device having a heater core receiving coolant from the engine of a vehicle for heating at least a portion of the air discharged into the passenger compartment of the vehicle, comprising:
   means for producing a first signal having a level varying in accordance with the difference between a desired temperature in the passenger compartment and the actual temperature in the passenger compartment;
   means for generating a second signal having a level proportional to the temperature of the coolant for the engine of the vehicle;
   means responsive to said first and said second signals for producing a control signal having a level varying in accordance with the level of said first signal but limited in accordance with said second signal; and
   means responsive to said control signal for driving the blower motor at a speed proportional to the level of the control signal so that the maximum speed of the blower motor is proportional to the temperature of the engine coolant.

2. An apparatus as claimed in claim 1 wherein said means for producing said first signal has a setting means for generating a setting signal having a level proportional to the desired temperature in the passenger compartment, a circuit including a sensor responsive to the temperature in the passenger compartment for generating an electric signal indicative of the actual temperature in the passenger compartment, and a circuit responsive to the setting signal and the electric signal for producing said first signal with a level proportional to the difference between the respective levels of the setting signal and the electric signal.

3. An apparatus as claimed in claim 2 wherein said sensor is a thermosensitive resistor the resistance value of which varies in accordance with the actual temperature of the passenger compartment.

4. An apparatus as claimed in claim 1 wherein said generating means includes a voltage divider including a thermosensitive resistor for sensing the temperature of the engine coolant, said voltage divider developing an electric signal having a level varying in relation to the temperature of the engine coolant.

5. An apparatus as claimed in claim 1 wherein the level of said first signal is proportional to the difference between the desired temperature in the passenger compartment and the actual temperature of the passenger compartment.

6. An apparatus as claimed in claim 1 wherein said means for producing a control signal includes first and second diodes and a bias circuit for providing a bias voltage to the cathode of each of said diodes, each of said first and said second signals is applied to the anode of a respective one of said diodes for producing a control signal having a level proportional to that of said first signal but limited to be not more than the level of said second signal.

7. An apparatus for controlling the blower motor of a device conditioning the air of a passenger compartment of a vehicle, said device having a duct, an evaporator arranged in the duct for cooling air flowing through the duct, a heater core arranged within the duct for receiving coolant from the engine of the vehicle to heat air flowing through the duct, and a shutter for changing the path of air flow within the duct to change between a heating mode and a cooling mode of the device, comprising:
   means for producing a first signal having a level varying in accordance with the difference between a desired temperature in the passenger compartment and the actual temperature of the passenger compartment;
   means responsive to said first signal for generating a first difference signal the level of which increases in accordance with an increase in the difference between the desired temperature in the passenger compartment and the actual temperature of the passenger compartment;
   means responsive to said first signal for generating a second difference signal the level of which decreases with an increase in the difference between the desired temperature in the passenger compartment and the actual temperature of the passenger compartment;
   means for generating a second signal having a level proportional to the temperature of the coolant of the vehicle engine of the vehicle;
   means responsive to said second signal and said first difference signal for producing a first control signal having a level varying in accordance with the level of said first difference signal but limited by the level of said second signal; and
   means associated with said blower motor for driving the blower motor at a speed proportional to the level of said first control signal when the device is used in the heating mode and to the level of said second difference signal when the device is used in the cooling mode.

8. An apparatus as claimed in claim 7 wherein said means for producing a first signal has a setting means for generating a setting signal having a level proportional to the desired temperature in the passenger compartment, a circuit including a sensor responsive to the temperature in the passenger compartment for generating an electric signal indicative of the actual temperature in the passenger compartment, and a circuit responsive to the setting signal and the electric signal for producing an output signal the level of which changes in relation to the difference between the setting signal and the electric signal.

9. An apparatus as claimed in claim 8 wherein said sensor is a thermosensitive resistor the resistance value of which varies in accordance with the actual temperature of the passenger compartment.

10. An apparatus as claimed in claim 7 wherein said driving means has a level discriminator having first and second diodes, and a bias circuit for providing a bias voltage to each cathode of said diodes, said first control signal and said second difference signal being applied to the anode of a respective one at said diodes.

* * * * *